United States Patent [19]
Wiedner et al.

[11] Patent Number: 5,461,724
[45] Date of Patent: Oct. 31, 1995

[54] ARTICLE OF CLOTHING, IN PARTICULAR FOR THE MEDICAL OR CHEMICAL FIELD HAVING BARRIER MEMBRANE IN CRITICAL AREAS

[75] Inventors: Guenther Wiedner, Seeshaupt, Germany; John A. Duncan, Glenrothes; Suresh R. Patel, Dalgety Bay, both of Scotland

[73] Assignee: Rotecno AG, Zuerich, Switzerland

[21] Appl. No.: 29,730

[22] Filed: Mar. 11, 1993

Related U.S. Application Data

[63] Continuation-in-part of Ser. No. 864,839, Apr. 7, 1992, Pat. No. 5,335,372.

[51] Int. Cl.$^6$ ..................................................... A41D 13/00
[52] U.S. Cl. .................. 2/2; 2/114; 2/901; 2/87; 2/83; 2/51; 2/82; 428/255; 428/102; 428/297; 428/302
[58] Field of Search .............................. 2/2, 16, 2.5, 114, 2/243, 272, 95, 87, 83, 105, 106, 243.1, 51, 901, 82; 604/378, 304, 381, 382; 602/58, 59; 428/247, 255, 102, 297, 302

[56] References Cited

U.S. PATENT DOCUMENTS

| | | | |
|---|---|---|---|
| 3,868,728 | 3/1975 | Krzewinski | 2/114 |
| 4,136,222 | 1/1979 | Jonnes | 2/272 |
| 4,316,456 | 2/1982 | Stoneback . | |
| 4,344,999 | 8/1982 | Gohlke | 2/51 |
| 4,408,357 | 10/1983 | Toth | 2/114 |
| 4,504,977 | 3/1985 | King et al. | 2/51 |
| 4,504,978 | 3/1985 | Gregory, Jr. et al. | 2/114 |
| 4,555,811 | 12/1985 | Shimalla | 2/51 |
| 4,586,196 | 5/1986 | White | 2/114 |
| 4,736,467 | 4/1988 | Schwarze et al. | 2/114 |
| 4,752,972 | 6/1988 | Neckerman et al. . | |
| 4,961,985 | 10/1990 | Henn et al. | 428/196 |
| 5,003,902 | 4/1991 | Benstock et al. . | |
| 5,017,424 | 5/1991 | Farnworth et al. | 428/230 |
| 5,027,438 | 7/1991 | Schwarze et al. | 2/114 |

FOREIGN PATENT DOCUMENTS

| | | | |
|---|---|---|---|
| 653304 | 7/1935 | Germany | 2/243 |
| WO8103265 | 11/1981 | WIPO | 2/114 |
| WO9000643 | 1/1990 | WIPO | 428/196 |

*Primary Examiner*—C. D. Crowder
*Assistant Examiner*—Gloria Hale
*Attorney, Agent, or Firm*—Townsend and Townsend and Crew

[57] ABSTRACT

An article of clothing for the medical or chemical field for protection against liquids and/or micro-organisms comprises at least three layers. The outer layer (1) is formed of a hydrophobic fabric which forms a liquid barrier and a micro-organism barrier. The inner layer (22) comprises at least one carrier material (24) having a net-like, apertured or open mesh structure secured to said outer layer at a non-critical position at which the danger of passage of liquids and/or micro-organisms through the outer layer is low. At least one membrane (26) is secured to the carrier material (24) at the aforementioned critical position at which the danger exists of the passage of liquid and/or micro-organisms through the outer layer.

16 Claims, 5 Drawing Sheets

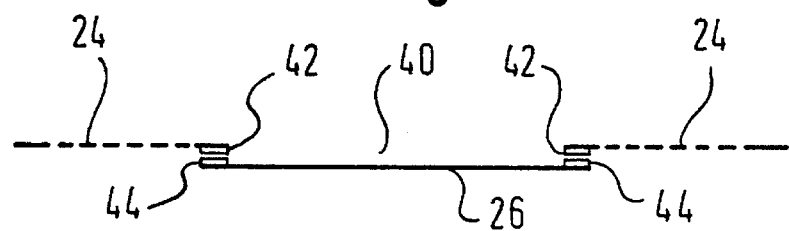
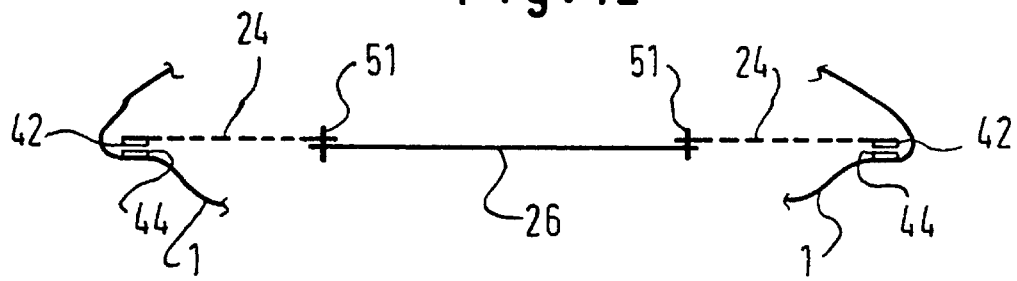
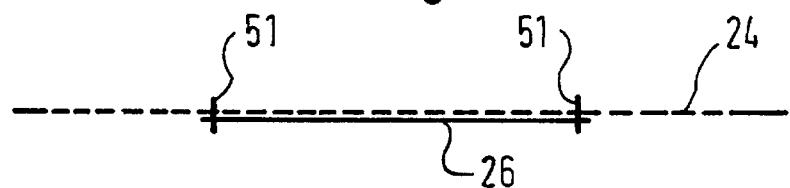
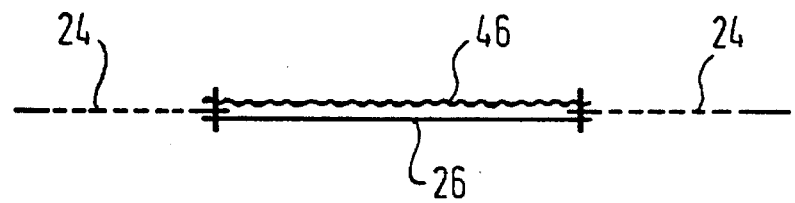
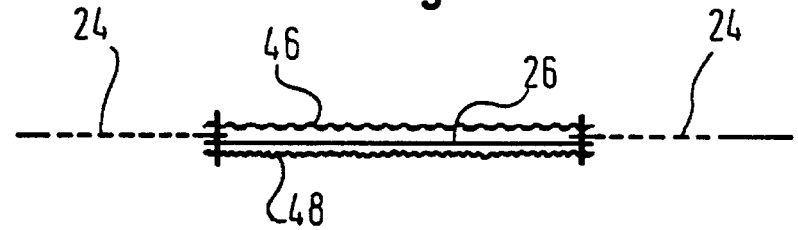

ARTICLE OF CLOTHING, IN PARTICULAR FOR THE MEDICAL OR CHEMICAL FIELD HAVING BARRIER MEMBRANE IN CRITICAL AREAS

RELATED APPLICATIONS

The present invention is a continuation in part of U.S. application Ser. No. 07/864,839, filed Apr. 7, 1992, now U.S. Pat. No. 5,335,372 and the disclosure of that application is being repeated here to facilitate a better understanding of the present invention. The invention of the parent application relates to an article of clothing, in particular for the medical or chemical field for protection against liquids and/or micro-organisms, the article of clothing comprising at least three layers, at least in part.

BACKGROUND OF THE INVENTION

Articles of clothing which consist of at least three layers are known, for example from the field of sport. Although such articles of clothing are entirely suitable for the intended uses and, for example, offer protection against rain and wind, but are nevertheless able to breath actively so that a requisite degree of comfort for the user is achieved, they are not straightforwardly usable for some important specific applications in the medical and chemical fields, for example, because of restrictions on their ability to be sterilized.

It is required of such articles of clothing, which are preferably worn by people who are active in the medical or chemical fields, that they, on the one hand, offer a high level of comfort to the wearer even over a long period of time and, on the other hand, form a reliable barrier for substances such as, for example, liquids and micro-organisms, in particular bacteria.

With these articles of clothing it can sometimes happen that substances pass through the article of clothing at particularly stressed positions, i.e. at critical positions which enter into intensive contact with the substances, such as the blood of patients under applied pressure.

SUMMARY OF THE INVENTION

Thus the object of the parent application and also the present invention is to provide an article of clothing which is preferably usable in the medical or chemical field and which effectively prevents the passage of substances, in particular liquids such as blood, and micro-organisms, in particular bacteria, through the article of clothing over an adequately large period of time, without the article of clothing however becoming uncomfortable to wear, and without the freedom of movement of the wearer being restricted. Not only gowns and overalls are regarded as articles of clothing within the sense of the invention, but rather also shoes, gaiters, caps and the like.

In accordance with the parent application this object is satisfied in an article of clothing of the initially named kind, in that an outer layer is formed of a tightly woven hydrophobic fabric which forms a liquid barrier and a micro-organism barrier; in that an inner layer comprises a material which likewise forms a liquid barrier and a micro-organism barrier and is preferably likewise hydrophobic; and in that an intermediate layer separates the outer layer and the inner layer, at least at one critical position, and prevents a direct contact of these layers.

Through the fact that the article of clothing, which can for example be a surgical gown or an overall used by a medical rescue orderly, comprises at least three layers, at least in part, it is possible to increase the time which is required for liquid to pass fully through the article of clothing to a considerable degree, in particular at stressed positions. The first and outer layer, which stands in direct contact with the substance, for example a liquid or a liquid containing micro-organisms, consists of a hydrophobic material which is closely woven from endless filaments and thereby forms the main protection for the wearer as a result of its characteristics, with barriers for bacteria and liquid. If a substance succeeds in passing through the first and outer layer of the article of clothing it will then encounter the intermediate layer. Passage of the substance, for example a liquid through the outer layer, can be caused when the wearer of the article of clothing is in particularly pronounced contact with the substance. This can, for example, arise if the wearer is carrying out actions in the interior of a body during an operation, or if the outer layer of the article of clothing comes into contact with the substance under substantial pressure and over a longer period of time through support of the elbow on a liquid contaminated substrate.

Through this intermediate layer, which effectively prevents direct contact of the outer and inner layers, it is ensured that the further movements of the substance or the liquid in the direction of the inner layer is counteracted. As a result of the intermediate layer the substance is forced to select the path of least resistance and to re-distribute itself in the intermediate layer, i.e. in directions approximately perpendicular to the direction of penetration. If an intermediate layer were not present then the contact pressure would lead to a wetting of the outer and inner layers with the substance so this substance could relatively quickly penetrate both layers at the positions of contact.

The construction of the invention effectively prevents the passage of the substance through the entire fabric over a period of time which can be much more than twice the time which was required in order to penetrate only one layer.

Furthermore, the types of fabric used are capable of active breathing so that, for example, sweat given off by the body of the wearer of the clothing can pass in the form of water vapor through the article of clothing at any time into the environment, whereby condensation inside the clothing is effectively prevented and the comfort of the wearer is increased. The fact that the intermediate layer is only provided in critical regions of the article of clothing means that the remaining regions can be of lighter construction, whereby the comfort to the wearer is further increased.

Furthermore, the design of the article of clothing in accordance with the invention ensures that the freedom of movement of the wearer is not restricted. This is, for example, of great significance with regard to the scope of movement required for an operation which extends over a longer period of time.

For the purpose of pleasant and comfortable wearing of the article of clothing provision is made, in an advantageous embodiment, that the inner layer is of lighter design than the outer layer. This is also made possible by the fact that the inner layer which does not come into direct contact with the environment is subject to substantially less stress than the outer layer.

In a further advantageous embodiment the seams which are present for the various layers are preferably displaced relative to one another. In this way it is ensured that an easy path through the article of clothing is not offered to liquid or bacteria via the stitches of two seams which lie on top of one another. If a liquid should for example succeed in passing through the outer layer then it will encounter the intermediate layer and will only contact the inner layer at a later time, if at all. As the inner layer does not have a seam at this position its liquid and bacteria blocking characteristics come fully into play and prevent passage through the article of clothing. Furthermore, attention is preferably paid to the fact that the seams are not arranged in regions in which critical positions are defined. This embodiment takes account of the fact that the substances are hindered less in passing through the seam positions than they are in passing through the individual layers.

In a further advantageous embodiment the intermediate layer has a grid-like or net-like structure which is preferably woven and consists of non-absorbent material. A substance which passes through the outer layer, for example a liquid, can flow without great resistance in directions perpendicular to the penetration direction, through interconnected receiving volumes which are formed between the meshes, from one receiving volume to the next, for example, as a result of the applied contact pressure. The substance is thus distributed in the intermediate layer and stored in the receiving volumes. After use the article of clothing is cleaned with the substance being removed from the receiving volumes. This succeeds despite the hydrophobic characteristics of the outer or inner layers because the surface tension of the washing liquid is set to a lower value during washing which makes wetting of the fabric possible.

In a further advantageous embodiment the intermediate layer consists of absorbent material, for example foam, however preferably of woven material with the fabric filaments being absorbent. The intermediate layer picks up the substance which passes through the outer layer. A further force must now be expended, additional to the force which is necessary to press the substance through the inner layer, in order to press the substance out of the intermediate layer. In this way the article of clothing as a whole becomes more impenetrable.

In accordance with a further advantageous embodiment the passage of substances through the article of clothing is fully prevented by an impermeable layer. However this layer should not be provided over the entire article of clothing because otherwise a disadvantage arises that the article of clothing is no longer capable of breathing.

The impermeable layer can preferably be provided in addition to the net-like or absorbent intermediate layer at particularly critical positions, for example in the elbow region, by which it is ensured that the penetration of substances at precisely the critical positions is effectively prevented, without however having to completely line the entire article of clothing with an impermeable layer. The net-like or absorbent intermediate layer thereby also provides take-up capacity for the liquid which penetrates the outer layer.

In a further advantageous embodiment a carrier layer is arranged between the outer and inner layers and is preferably formed in grid-like manner with a relatively large grid spacing. An intermediate layer can be mounted at the particularly critical regions onto this carrier layer. The carrier layer can be present throughout the entire article of clothing because it is not particularly noticeable. In this arrangement it is of particular advantage that the carrier layer does not have to be secured at the critical positions, thus it is, for example, possible to apply an impermeable layer at a desired position without having to use seams at the critical positions, since the impermeable layer is carried at the critical positions by the carrier layer.

In accordance with the present C.I.P. application a further solution of the principal object underlying the present invention is achieved by an article of clothing comprising at least inner and outer layers, at least in part, the article of clothing being characterized in that the outer layer is formed of a tightly woven hydrophobic fabric which forms a liquid barrier and a micro-organism barrier; and in that the inner layer comprises at least one carrier material having a net-like apertured or open mesh structure secured or securable to said outer layer at at least one position which is less susceptible to the ingress of liquids and/or micro-organisms, in particular at side or back seams or at the shoulder and cuff seams of a gown, and in that at least one membrane is secured to said carrier material at at least one critical position at which the danger exists of the passage of liquids and/or micro-organisms through said outer layer.

In this embodiment there are thus a minimum of two layers in distinction to the three layers of the previous embodiments. The carrier material or fabric serves a multiple function in this alternative solution. On the one hand the carrier material serves, as previously, to position the membrane so that this covers critical regions of, for example, a surgeon's gown. Such critical regions typically comprise the trunk and abdomen regions and the arms. At the same time the carrier material, by virtue of its net-like, apertured or open mesh structure, permits a relatively free flow of air within and into and out of the space between the outer layer and the membrane and thus greatly improves the comfort of the gown so far as the surgeon or wearer is concerned. More particularly it is envisioned that the movements which inevitably take place during use of the gown arising from actions of the wearer will generate a type of pump action between the two layers which are movable relative to one another, at least towards and away from each other so that this pump action will itself induce an air flow between the outer layer and the membrane and onto and around the wearer's body which will also improve the degree of comfort for the wearer.

The openings in the carrier material also have the decided advantage that they greatly facilitate the cleaning and sterilization of the article because the cleaning or sterilizing fluid, e.g. steam, then has ready access to the inside of the outer layer and to the surface of the membrane confronting the same.

The carrier material is preferably made as a resiliently extensible and flexible layer so that the general stiffness of the gown is reduced and again the gown is more comfortable for the wearer.

Several different realizations of this basic concept of the invention are possible.

More specifically the carrier material may extend behind the membrane on the side remote from the outer layer and may form a laminate together with this membrane. In this case the membrane could be stitched at its edge to the carrier layer or could be adhesively bonded thereto at its edge, or over its full area, or only at discrete regions. Alternatively, the carrier material can be provided with an opening at the position at which the membrane is arranged with the membrane being secured to the carrier material, for example at its marginal edge around the opening. This connection can take place by stitching without any particular precautions since the apertured carrier material is in any case not a barrier to contaminated liquid and fluid. It will be understood that the membrane is chosen to be of a sufficient extent and arranged so that it extends in all directions beyond locations at which the direct penetration of liquid and/or micro-organisms through the outer layer is to be feared.

As indicated previously the membrane can for example be arranged in the trunk and abdomen regions of the gown in which case it conveniently comprises an essentially planar sheet material. Alternatively or additionally such membranes can be provided in one or both arms of the gown. In this case the or each membrane comprises a tubular structure and is typically secured to the gown by said carrier material at at least one of the cuff or shoulder regions of the sleeve. The use of a highly air-permeable carrier material at the shoulder region ensures good ventilation at the wearer's armpits which again improves the comfort of the gown. A similar beneficial effect is achieved at the wrist of cuff region. Although it might appear that the use of a carrier material which is naturally not only permeable to air but also to liquid is undesirable at the cuff region it should be pointed out that the cuff regions are covered by gloves in use, so that there is already added protection in this area against the penetration of contaminated liquid. Hence the use of an air-permeable carrier material at this location can be realistically considered. If particular worries exist in this area then the use of the carrier material can be restricted to the shoulder region. Indeed it is conceivable that the membrane of the sleeve insert could be attached at only one end to the gown, preferably at the shoulder end to facilitate entry into the gown.

The or each membrane can be permanently secured within the article of clothing or can be removably secured therein. This can take place either by releasable securing means connecting the membrane to the carrier material or by releasable securing means connecting the carrier material to the outer layer. Any of the conventionally used connecting means can be considered, for example a hook and loop fastener, marketed under the trademark VELCRO, a press stud fastener or indeed a zip fastener.

The use of removable membranes, or removable inner layers, has the advantage that for some categories of operation where contaminated liquids or excessive amounts of liquids or body fluids are not to be expected the inner layer can be omitted altogether so that the wearer has an altogether lighter and more comfortable gown. Moreover, the sterilization of the gown can in this way be further improved. In addition only a limited variety of sizes of membrane need be made which can be used with a larger variety of gown sizes used for the outer layer material. This can simplify storage and stock holding facilities. Moreover, should either the outer layer or the inner layer become damaged it can be replaced without having to replace the whole gown. Stock holding is also facilitated in this way.

The membrane can be realized in various ways. For example it can comprise a liquid-impermeable but water vapor permeable material, for example a foil or textile material, or it may comprise a material impermeable to both water and water vapor. It is also possible to realize the membrane as a composite membrane comprising at least first and second layers with the first layer being disposed adjacent the outer layer and the second layer being disposed on a face of the first layer remote from the outer layer. In this case the first and second layers can comprise the following material pairs:

a) a liquid and water vapor impermeable foil as a first layer and an open mesh woven or non-woven fabric as a second layer, with an absorbent layer optionally being provided on at least one face of said first layer, b) a liquid-impermeable but water vapor permeable foil-like membrane as a first layer and an open mesh woven or non-woven fabric as a second layer, again with an absorbent layer optionally being provided on at least one face of said first layer.

Further advantageous embodiments are defined in the subordinate claims.

The invention will now be described in more detail in the following with reference to the drawings in which FIGS. 1 to 8 comprise, FIGS. 1 to 8 of the parent application U.S. Ser. No. 07/864,839 and FIGS. 9 to 15 relate to the invention of the present C.I.P. application. An understanding of the invention of FIGS. 1 to 8 is useful for an understanding of the present invention and some of the elements of the present invention will only be described with reference to corresponding items in the invention of FIGS. 1 to 8.

BRIEF DESCRIPTION OF THE DRAWINGS

FIG. 11 is a partial view similar to FIG. 10 but showing an alternative form of connection between a carrier material and a membrane, FIG. 12 is a partial view similar to that of FIG. 10 but with the outer layer broken away and showing an alternative connection between a carrier material and the outer layer, and FIGS. 13, 14 and 15 are views similar to that of FIG. 11 but showing alternative embodiments.

DESCRIPTION OF THE PREFERRED EMBODIMENTS

The use of the invention is not restricted to the following embodiments which are set forth purely by way of example.

Figure 1:
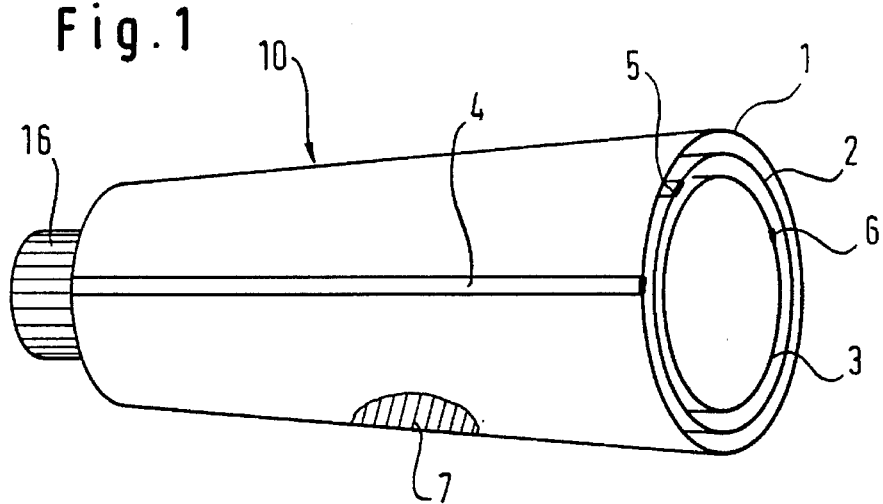
FIG. 1 is a sectional view of an arm or sleeve of an article of clothing in accordance with the invention.

In FIG. 1 there is shown an arm part 10 of an article of clothing which is built up of an outer layer or ply 1, an intermediate layer or ply 2 and an inner layer or ply 3.

The outer layer 1 consists in this example of a construction of micro-fibers (micro-fibers are fibers under 1 dTex) which has more than 12,000 individual filaments per $mc^2$. For example, in one direction (warp or weft direction) 60 threads are provided each having 144 individual filaments. The filaments can, for example, consist of polyester and are treated to render them hydrophobic using conventional textile technology. In order to prevent an electrostatic charge, continuous conductive threads 20, 21 are preferably woven-in cross-wise at short intervals of, for example, 5 mm in both the inner layer 1 and the outer layer 3 (see FIG. 4).

In this way electrostatic spark discharge and the attraction of lint, fluff and dust is prevented, which is particularly important when working under the cleanest conditions and in the vicinity of sensitive measurement instruments.

The inner layer 3 can be identical with the outer layer 1 or can also have a less dense structure.

The intermediate layer 2 which is provided between the outer layer 1 and the inner layer 3 prevents direct contact between these two layers 1 and 3 so that on contact with the substance under pressure this substance cannot be simultaneously pressed through the two layers.

Figure 2:
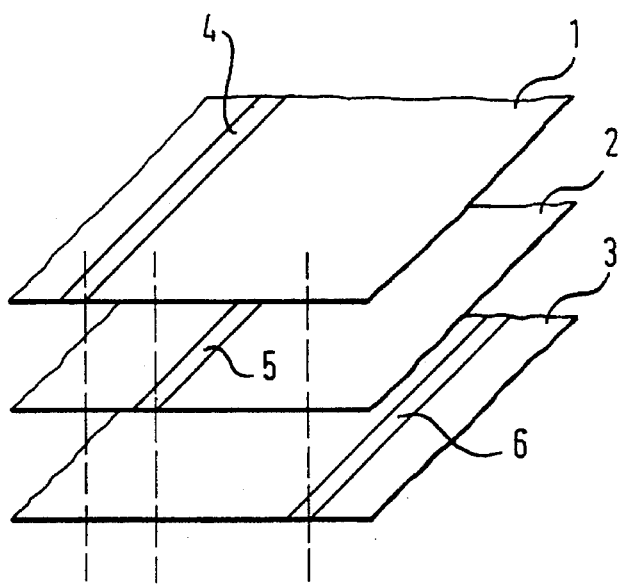
FIG. 2 is a part section of an exploded drawing of three layers with the seams arranged above one another.

The seam 4 of the outer layer 1, the seam 5 of the intermediate layer 5 and the seam 6 of the inner layer are, as is particularly emphasized in FIG. 2, respectively mutually displaced so that they do not come into direct or indirect contact with one another and are not arranged in a critical region 7.

A resilient cuff 16, preferably of double cuff, is provided as the termination of the sleeve part 10 and adapts in form-fitted manner to the corresponding arm region of the wearer. In the operating theater this cuff is covered over by a glove.

The intermediate layer 2 can be made in different embodiments. In accordance with FIG. 3, which shows a schematic build-up or an article of clothing, the outer layer 1 and the inner layer 3 are formed as in FIG. 1. The intermediate layer 2 consists for example of a grid-like material 2' which has interconnected receiving volumes (volumina 17) between the meshes and consists of an non-absorbent material. The liquid which is forced in through the outer layer can thus flow from one receiving volume to the next and thus distributes itself in the intermediate layer 2. In this arrangement, the size of the mesh intervals of the pick-up volumes 17 is preferably contrived so that the outer layer 1 and the inner layer 3 cannot enter into contact with one another through these openings 17.

Figure 3:
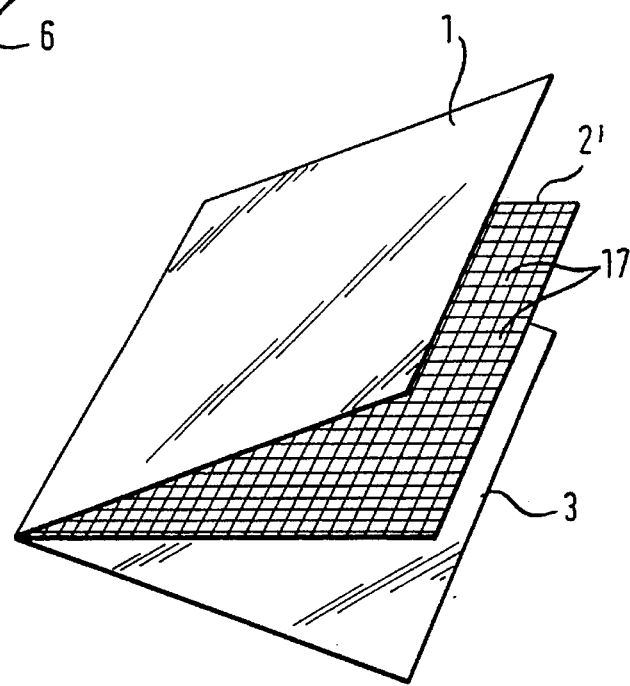
FIG. 3 is the schematic build-up of an article of clothing with a net-like intermediate layer.
Figure 4:
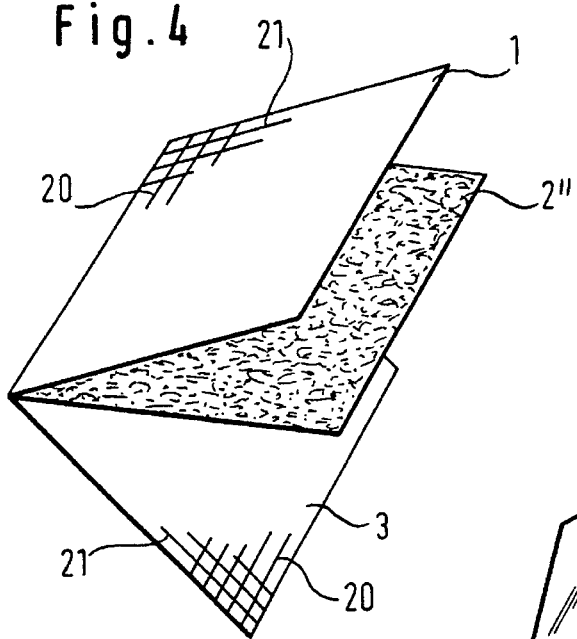
FIG. 4 is the schematic build-up of an article of clothing with an absorbent intermediate layer.

FIG. 4 shows an embodiment as in FIG. 3; however the intermediate layer 2 consists of an absorbent material 2". By way of example the material can be woven of polyester filaments which each consist of a plurality of filaments. In this way a capillary action is generated by the small spacings between the individual filaments and this capillary action brings about a strongly absorbent effect. This effect can be increased in accordance with the invention by treating the fabric to render it hydrophilic.

The use of the same type of chemical materials in all the layers 1, 2, 3 (in the above embodiment in the form of polyester) has the particular advantage that the shrinkage of the various layers 1, 2 and 3 and their behavior when sterilized are similar.

Furthermore, pick-up volumes are always formed in a woven fabric so that a substance which has penetrated through the outer layer can also be picked up by these volumes with an appropriate design of the fabric.

Figure 5:
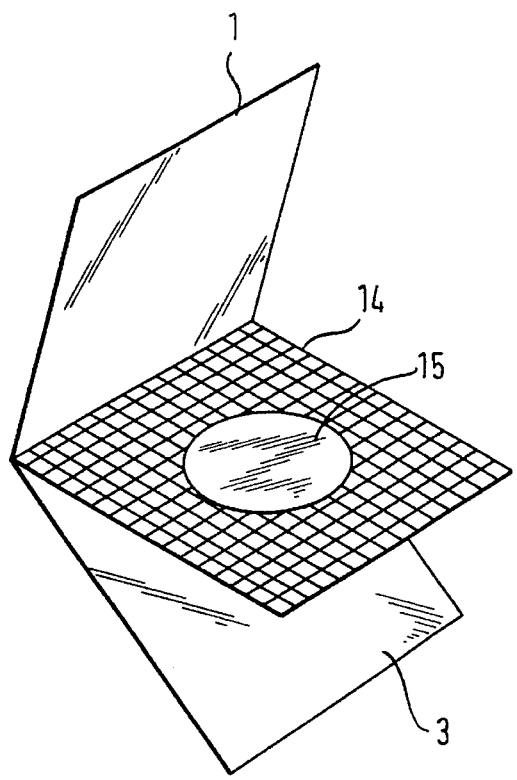
FIG. 5 is the schematic build-up of an article of clothing with a net-like intermediate layer and an additional impermeable material arrangement.

In accordance with FIG. 5, which likewise shows the schematic build-up of an article of clothing, the article of clothing consists of an outer ply 1, a carrier layer 14 and an inner ply 3. An impermeable material 15 is additionally provided on the carrier layer 14 which has a grid-like structure and the material 15 can be provided in the form of a liquid-tight foil or membrane which is applied to a particularly critical location 7 of the article of clothing.

Figure 8:
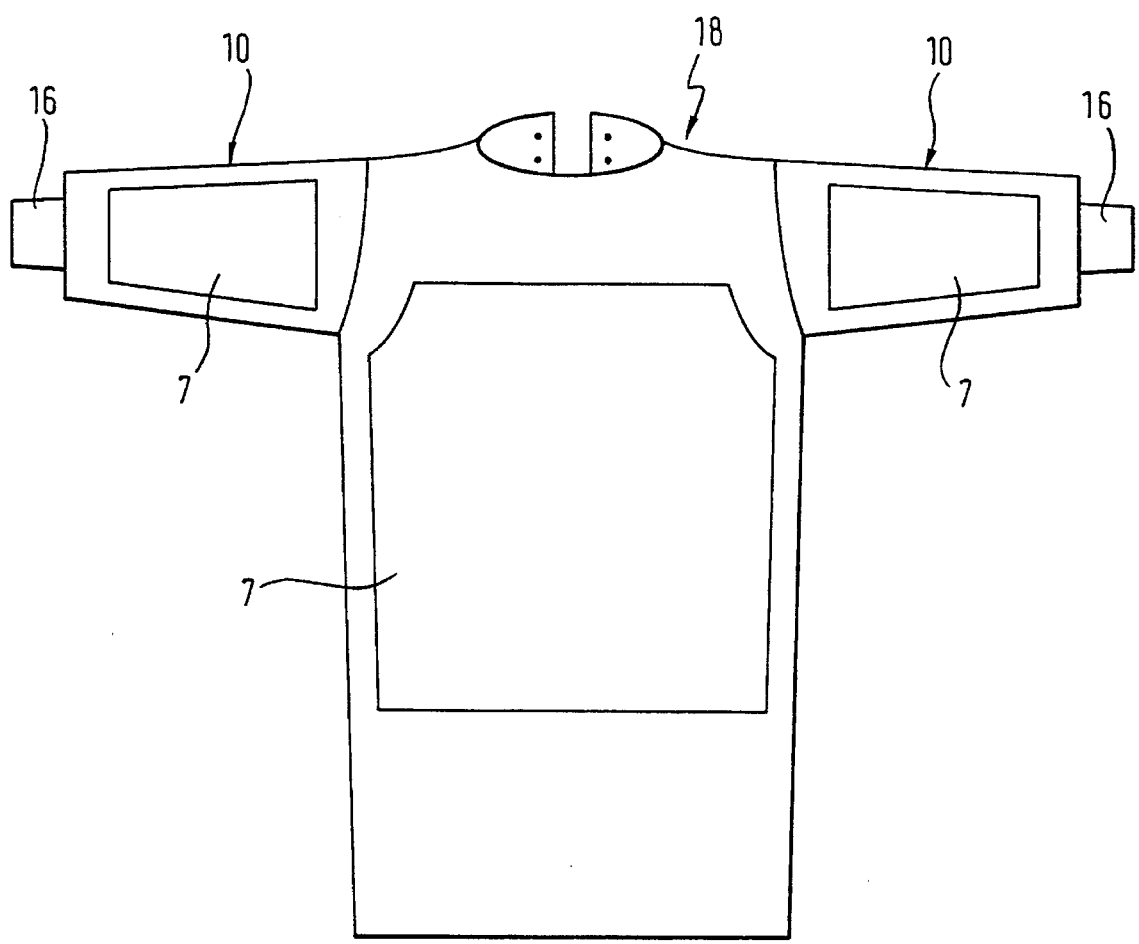
FIG. 8 is a schematic illustration of a surgeon's gown or smock in accordance with the invention.

In accordance with FIG. 8 a smock-like article of clothing 18 is shown in which the critical positions 7 are defined in the arm parts 10 and in the breast region.

Figure 6:
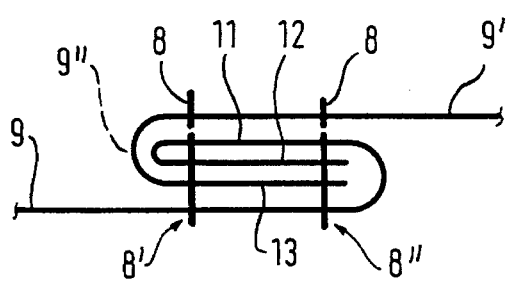
FIG. 6 is a schematic sectional view of a seam.
Figure 7:
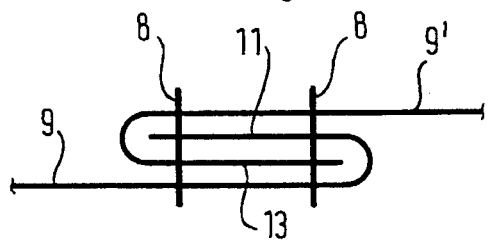
FIG. 7 is a schematic sectional view of a further seam.

Examples of seams are shown in FIGS. 6 and 7 with the reference numeral 8 characterizing the stitches and reference numerals 9 and 9' defining the materials to be connected. In accordance with FIG. 6, the end of the material part 9' is folded back whereby the material part 9' and the folded back end 13 of the material part 9' form a pocket. The end of the material part 9 is folded over twice, so that this material part 9 consists of three plies 9, 11 and 12 at its edge. The two plies 11 and 12 are introduced into the above-named pocket so that the plies lie on top of one another in the sequence 9', 11, 12, 13 and 9 and are doubly sewn together at 8' and 8". The embodiment of FIG. 7 represents a simplified embodiment in comparison to FIG. 6 because the end of the material part 9 is only folded over once. Thus at the seam location only four layers of the material lie on top of one another.

Embodiments of seams are also known in which the stitching threads do not fully penetrate the entire seam. Thus, in FIG. 6 for example, the seam can be so modified that before sewing it together the part of the material 9" is folded upwardly and thus only the parts 9, 13, 12 and 11 are sewn together. If the material part 9" is then folded over the seam then the seam is not accessible from the outside.

Figure 9:
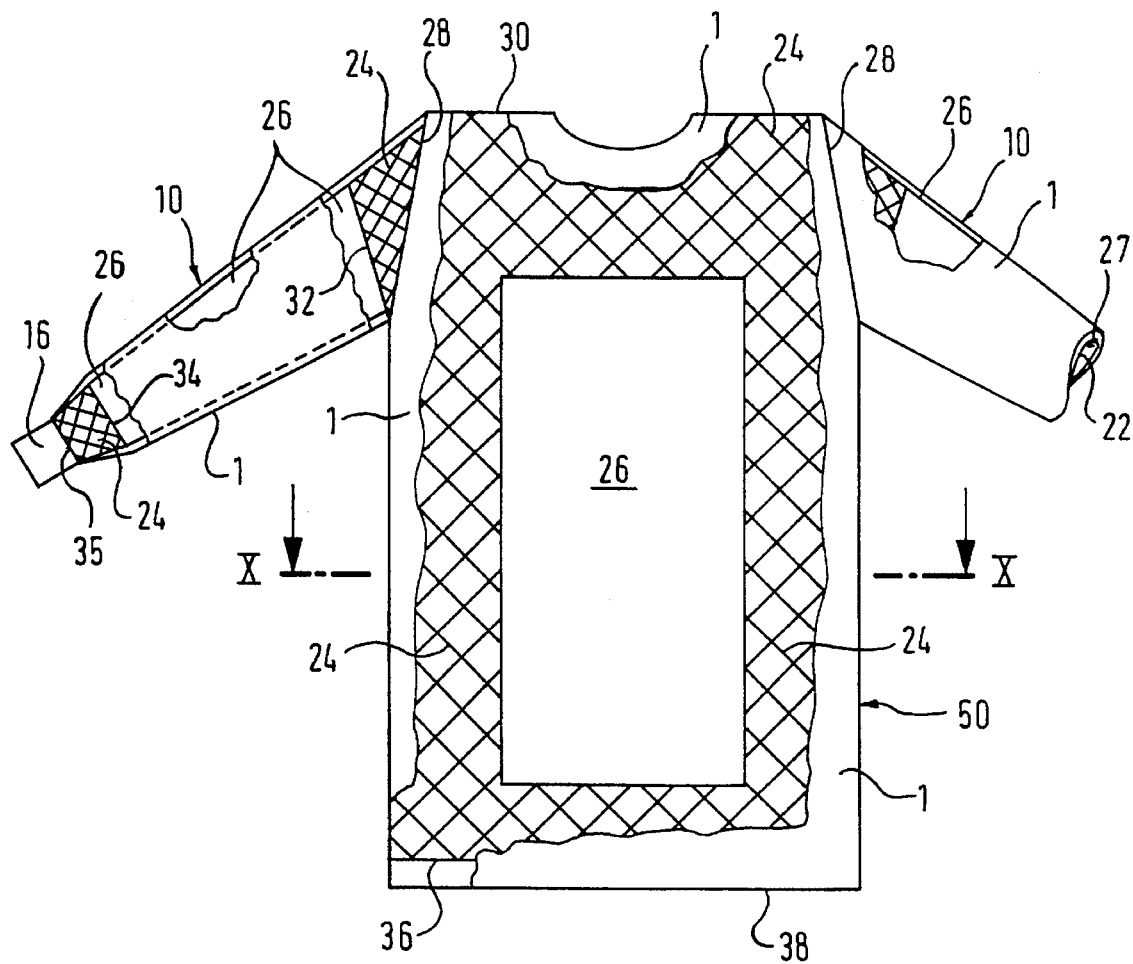
FIG. 9 is a partly broken away front view of a surgeon's gown in accordance with the invention.
Figure 10:
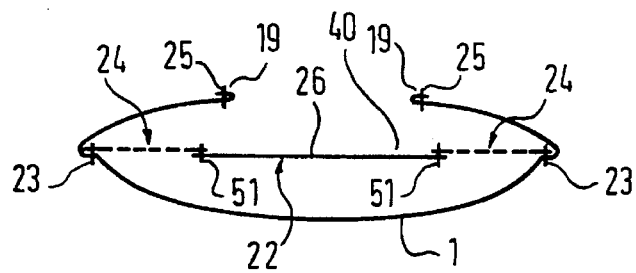
FIG. 10 is a cross-sectional view of the gown of FIG. 9 on the plane X—X of FIG. 9.

Turning now to FIGS. 9 and 10 there can be seen an article of clothing in accordance with an alternative embodiment of the present invention. In the following discussion the same reference numerals will be used to describe parts having counter-parts in the previously discussed embodiments and new reference numerals will be used for features which differ from those of the preceding embodiments. Where common reference numerals are used, then it will be understood that the material of the embodiment of FIGS. 9 and 10 and of the subsequent variants of FIGS. 11 to 15 consist of the same material as was described for the element of the same reference numeral in relation to the preceding figures.

More specifically FIGS. 9 and 10 show again a surgeon's gown comprising a body portion 20 and two arms or sleeves 10 with the left-hand arm 10 (at the right side of the drawing) being shown in part to further illustrate the internal construction. In FIG. 9 the outer layer of the garment is shown largely broken away at the front, again to facilitate an understanding of the internal construction.

As can be seen from FIGS. 9 and 10, in particular from FIG. 10, the article of clothing or gown basically comprises an outer layer 1 which extends all around the front of the gown to two vertical seams 19 at the back which, in the usual manner for surgical gowns, are tied by straps or tapes around the back of the wearer. The same outer layer material 1 is provided for the outer layers of the sleeves including the shoulder portions with the cross-hatching. Inside the outer layer 1 there is provided, at the front of the garment, an inner layer 22 which is in fact a composite layer comprising a carrier material in the form of net portions 24 and a foil-like membrane 26. As indicated in FIG. 9, which is to be viewed as having been drawn with a certain degree of artistic license and not as a strictly accurate technical drawing of the gown, the membrane 26 is generally rectangular in shape and is surrounded on all four sides by the net 24. The drawing of FIG. 9 is in fact shown with the front layer 1 largely broken away so that the net-like carrier material or fabric 24 and the membrane 26 can readily be seen. In fact the whole of the front of the garment is covered by the outer layer 1. At the rear the garment only comprises the outer layer 1; here there is no inner layer since it is not necessary at this location. Stitched seams are indicated by short vertical lines and the reference numerals 21, 23 and 25.

The sleeves 10 again have the dual structure with an outer layer 1 and an inner layer 22 with the inner layer comprising a membrane, in this case a sleeve-shape tubular membrane 26 (typically formed by rolling a flat membrane into a conical cylinder and forming a seam 27 at the point where the longitudinal edges meet), with the cylindrical sleeve being attached to the shoulder seam 28 of the outer sleeve material 1 with the shoulder portion 30 of the outer layer of the gown via a net-like carrier material 24. As can be seen from the right-hand sleeve of the gown of FIG. 9 (left-hand side of the drawing) the wrist end of the inner sleeve-like membrane 26 is also connected to the cuff 16 via a net-like material 24. That is to say the net-like insert 24 at each shoulder portion of the gown is connected via a first seam 28 to the shoulders of the body of the gown and via a second seam 32 to the shoulder end of the sleeve-shaped inner membrane 26. The wrist end of the sleeve-like inner membrane 26 is connected via a seam 34 to the net-like insert 24 and the other end of this net-like insert is then connected by a further seam 35 to the inside of the double cuff 16, e.g. by a seam to the inside edge thereof or by adhesive bonding to the inner side of the U-shaped space formed by the double cuff, the mouth of the U-shaped space being disposed towards the shoulder.

At the base of the gown the inner layer 1 is turned inwardly so that its upper edge which may be turned over on itself lies higher than the actual lower edge 38 of the gown. In this way a U-shaped channel is formed which can collect any liquid which may ultimately drip downwardly from the front membrane 26. It should be noted that this channel is not essential and indeed it may be preferable to simply leave the bottom edge of the gown open so that any liquid which may penetrate the gown, or perspiration which may run from the surgeon or wearer, can simply escape downwardly onto the floor of the operating theater.

Various modifications are shown in the further FIGS. 11 to 15. In FIG. 11 the net-like carrier material 24 at the front of the gown is again provided with an opening 40 (as in the FIGS. 9 and 10 embodiments) which is only fractionally smaller than the membrane 26. In this embodiment the membrane 26 is however removably connected to the net-like carrier material 24 with hook and loop fasteners carried on mating tapes 42 and 44 of material which are sewn to the net-like carrier material and to the membrane 26 respectively (or adhesively bonded thereto). That is to say the permanent connection effected by stitching in the embodiment of FIG. 10, as illustrated by the short vertical lines 21, is replaced here by a releasable connection.

FIG. 12 shows a further similar embodiment in which the entire inner layer comprising the net-like carrier material 24 and the membrane 26 sewn thereto is removable from the outer layer 1, which is only shown in part for simplicity of illustration. Again the connection takes place by means of tapes of material 42, 44 having cooperating hook and loop fasteners and sewn to the inner layer and the outer layer 1.

FIG. 13 shows another possible embodiment in which the net-like material 24 is a continuous layer and the membrane 26 is simply sewn onto this layer at the edges. Alternatively it could be adhesively bonded to the net-like layer 24.

In FIG. 14 the membrane comprises a composite membrane in the form of a foil 26 which is impermeable both to liquid and to water vapor and a backing layer 4,6 which is provided on the face of the membrane 26 remote from the outer layer 1 and which can consist of an open mesh woven or non-woven fabric. The idea of this layer is simply to provide added comfort for the wearer and to provide a certain measure of perspiration absorption, as well as to improve the tearing and anti-kinking properties of a (lightweight) foil membrane. In an alternative version of this embodiment, which is not shown in its own right, the foil 26 can be a plastic foil which is totally impervious to both liquids and water vapor. Foils with these characteristics, and also foils which are liquid-impermeable but vapor permeable, are well known per se.

Finally, FIG. 15 shows an embodiment similar to that of FIG. 14 but with an additional absorbent layer 48 provided on the face of the membrane 26 facing the outer layer 1 (not shown but understood in all FIGS. 13, 14 and 15 to be beneath the layer structure illustrated). The purpose of this layer is simply to spread any liquid which may penetrate the first layer 1 so that it does not run off the inner membrane 26 but is instead retained in the absorbent material. A layer of this kind can also be provided in all the previously described embodiments.

It will be appreciated that the net-like carrier material 24 can be formed in a variety of ways either as a true net with meshes, or as an open mesh fabric, or indeed as a tighter mesh fabric with a plurality of apertures formed therein. In all cases the open structure of the fabric permits ready flow of air therethrough and facilitates air circulation and convection making the garment itself more comfortable for the wearer. In addition movements of the user will produce changes of the relative positions of the membrane and the first layer 1 thus opening up and closing the spacing between them, at least locally, and this will generate a type of pump action ensuring ready ventilation of the garment. Moreover sterilization and washing are improved.

What is claimed is:

1. Article of clothing for protection against at least one of liquids and micro-organisms, the article of clothing comprising at least an inner layer and an outer layer, the outer layer being a hydrophobic fabric forming a liquid barrier and a micro-organism barrier, the inner layer including at least one carrier material having a net-like, apertured or open mesh structure secured to said outer layer at at least one non-critical position at which the danger is low of passage of at least one of liquids and micro-organisms through the outer layer, and at least one membrane secured to said carrier material at at least one critical position at which the danger exists that at least one of liquid and micro-organisms passes through said outer layer.

2. Article of clothing in accordance with claim 1, wherein said hydrophobic fabric comprises a tightly woven fabric.

3. Article of clothing in accordance with claim 1, wherein said carrier material is secured to said article of clothing at at least one of the following seams: a side seam, a back seam, a shoulder seam or a cuff seam.

4. Article of clothing in accordance with claim 1, wherein the carrier material extends behind said membrane on a face of the membrane remote from said outer layer.

5. Article of clothing in accordance with claim 1, wherein the carrier material comprises an opening in which said membrane is arranged.

6. Article of clothing in accordance with claim 1, comprising a gown having chest and abdomen regions, and wherein said membrane comprises an essentially planar sheet material disposed at said chest and abdomen regions of a gown.

7. Article of clothing in accordance with claim 1, comprising a gown having first and second sleeves, shoulder regions and cuffs on said first and second sleeves, wherein said membrane comprises a tubular structure disposed in at least one of said sleeve and secured to said gown by said carrier material at at least one cuff and one shoulder region.

8. Article of clothing in accordance with claim 1, including means for releasably securing the membrane within said article of clothing to said carrier material.

9. Article of clothing in accordance with claim 1, wherein the membrane comprises a hydrophobic, liquid impermeable but water vapor permeable fabric.

10. Article of clothing in accordance with claim 1, wherein the membrane comprises a liquid impermeable but water vapor permeable foil.

11. Article of clothing in accordance with claim 1, wherein said membrane is a composite membrane comprising at least first and second layers, said first layer being disposed adjacent said outer layer and said second layer being disposed on a face of said first layer remote from said outer layer, said first and second layers comprising one of the following material pairs:

(a) a liquid and water vapor impermeable foil as a first layer and an open mesh fabric as a second layer, (b) a liquid impermeable but water vapor permeable membrane as a first layer and an open mesh fabric as a second layer.

12. Article of clothing in accordance with claim 1, wherein said membrane and said carrier material form a laminate.

13. Article of clothing in accordance with claim 1, wherein said carrier material comprises a resilient extensible material.

14. Article of clothing in accordance with claim 1, wherein the membrane is removably secured within said article of clothing by releasable securing means connecting said carrier material to said outer layer.

15. Article of clothing in accordance with claim 1, wherein the membrane comprises a hydrophilic, liquid impermeable but water vapor permeable fabric.

16. An article of clothing in accordance with claim 11 wherein at least one of the material pairs (a) and (b) includes an absorbent layer provided on at least one face of the first layer.

* * * * *